US008905355B2

(12) United States Patent
Richardson et al.

(10) Patent No.: US 8,905,355 B2
(45) Date of Patent: Dec. 9, 2014

(54) WIRELESS REFUELING BOOM

(75) Inventors: Forrest E. Richardson, Wichita, KS (US); Carl W. Beck, Haysville, KS (US); Lance A. Cutler, Maize, KS (US); Mark A. Shelly, Bel Aire, KS (US)

(73) Assignee: The Boeing Company, Chicago, IL (US)

( * ) Notice: Subject to any disclaimer, the term of this patent is extended or adjusted under 35 U.S.C. 154(b) by 421 days.

(21) Appl. No.: 13/238,800

(22) Filed: Sep. 21, 2011

(65) Prior Publication Data

US 2013/0068889 A1    Mar. 21, 2013

(51) Int. Cl.
*B64D 39/00* (2006.01)
*B64D 39/04* (2006.01)

(52) U.S. Cl.
CPC ............... *B64D 39/04* (2013.01); *B64D 39/00* (2013.01)
USPC .................................. 244/135 A; 244/135 R

(58) Field of Classification Search
USPC ................................ 244/135 A, 135 R, 1 TD
See application file for complete search history.

(56) References Cited

U.S. PATENT DOCUMENTS

| | | | | |
|---|---|---|---|---|
| 2,941,761 A | * | 6/1960 | Cox et al. ................... | 244/135 A |
| 3,475,001 A | * | 10/1969 | Hieber ....................... | 251/149.8 |
| 3,794,270 A | * | 2/1974 | Wilkens ..................... | 244/172.4 |
| 4,381,092 A | * | 4/1983 | Barker ....................... | 244/172.4 |
| 4,438,793 A | | 3/1984 | Brown | |
| 5,131,438 A | * | 7/1992 | Loucks ............................. | 141/1 |
| 5,326,052 A | * | 7/1994 | Krispin et al. ............. | 244/135 A |
| 5,906,336 A | * | 5/1999 | Eckstein ................... | 244/135 A |
| 5,996,936 A | | 12/1999 | Mueller | |
| 5,996,939 A | | 12/1999 | Higgs et al. | |
| 6,604,711 B1 | * | 8/2003 | Stevens et al. ............ | 244/135 A |
| 6,669,145 B1 | * | 12/2003 | Green ........................ | 244/135 A |
| 6,869,042 B2 | * | 3/2005 | Harrison ........................... | 244/2 |
| 6,889,941 B1 | * | 5/2005 | McElreath et al. ........ | 244/135 A |
| 6,926,049 B1 | * | 8/2005 | Enig et al. ....................... | 141/387 |
| 6,966,525 B1 | * | 11/2005 | Schroeder ................. | 244/135 A |
| 6,988,693 B2 | * | 1/2006 | Shelly ....................... | 244/135 A |

(Continued)

FOREIGN PATENT DOCUMENTS

CN          2575078 Y      9/2003
CN         201177514 Y     1/2009

(Continued)

OTHER PUBLICATIONS

International Search Report and Written Opinion for International Application No. PCT/US2012/051638 dated Feb. 27, 2013; 13 pages.

*Primary Examiner* — Isam Alsomiri
*Assistant Examiner* — Justin Benedik
(74) *Attorney, Agent, or Firm* — Toler Law Group, PC

(57) ABSTRACT

A refueling boom is described. The refueling boom includes a non-telescoping portion configured to be coupled to a fuel tanker vehicle and a telescoping portion that is extendable and retractable relative to the non-telescoping portion. The telescoping portion includes a fuel nozzle. The refueling boom also includes a wireless communication system operable to enable wireless communication between a first location of the telescoping portion to a second location of the non-telescoping portion. The refueling boom also includes a control unit coupled to the telescoping portion. The control unit is operable to send first information to the fuel tanker vehicle via the wireless communication system and to receive second information from the fuel tanker vehicle via the wireless communication system.

14 Claims, 4 Drawing Sheets

(56) References Cited

U.S. PATENT DOCUMENTS

| | | | |
|---|---|---|---|
| 6,994,294 B2* | 2/2006 | Saggio et al. | 244/135 A |
| 7,007,894 B1* | 3/2006 | Takacs et al. | 244/135 A |
| 7,036,770 B2* | 5/2006 | Shelly et al. | 244/135 A |
| 7,137,598 B2* | 11/2006 | Von Thal | 244/135 A |
| 7,185,854 B2* | 3/2007 | Von Thal et al. | 244/135 A |
| 8,186,623 B2* | 5/2012 | Feldmann | 244/135 A |
| 8,639,395 B2 | 1/2014 | Hudson | |
| 2003/0136874 A1 | 7/2003 | Gjerdrum | |
| 2003/0205643 A1* | 11/2003 | von Thal et al. | 244/135 A |
| 2005/0045768 A1* | 3/2005 | Saggio et al. | 244/135 A |
| 2006/0145023 A1* | 7/2006 | Babb et al. | 244/172.4 |
| 2006/0208132 A1 | 9/2006 | Jones | |
| 2009/0248225 A1 | 10/2009 | Stecko et al. | |
| 2010/0001124 A1* | 1/2010 | Feldmann | 244/58 |
| 2010/0025536 A1 | 2/2010 | Schroeder | |

FOREIGN PATENT DOCUMENTS

| | | |
|---|---|---|
| CN | 201876505 U | 6/2011 |
| WO | 2006137827 A1 | 12/2006 |
| WO | 2010118131 A2 | 10/2010 |
| WO | 2010118131 A3 | 10/2010 |

* cited by examiner

WIRELESS REFUELING BOOM

FIELD OF THE DISCLOSURE

The present disclosure is generally related to a refueling boom.

BACKGROUND

Vehicle refueling systems, such as in-flight refueling systems, may use a boom to transfer fuel from a fuel tanker vehicle to a fuel receiving vehicle. The boom may include control systems and communication systems that facilitate refueling of the fuel receiving vehicle. To facilitate communication of control signals and voice communications, one or more wires or other physical electrical connectors may run the length of the boom. The wires or other physical or electrical connections may be subject to wear and tear as a result of relative movement of portions of the boom. To address this concern, some booms use contact strips with brushes or spring-type contacts as well as coiled-type phone cords that maintain the electrical connection during relative movement of portions of the boom.

SUMMARY

Wireless communications are used to facilitate communication of control signals or other signals between a telescoping portion of a boom and a non-telescoping portion of a boom. Since no physical electrical connections may extend between the telescoping portion of the boom and the non-telescoping portion of the boom, voice communications, control signals, etc. may be communicated wirelessly. Additionally, control systems coupled to the telescoping portion of the boom may be powered independently of the non-telescoping portion of the boom. For example, an independent power source, such as one or more of a ram air turbine, a battery, a solar powered device, and a fuel cell, may be provided coupled to the telescoping portion of the boom. Further, the wireless communication system may be configured to accommodate rotation of the telescoping portion of the boom relative to a center line of the non-telescoping portion of the boom. For example, the wireless communication system may include a plurality of transceiver devices coupled circumferentially around an axis of rotation of the non-telescoping portion of the boom, and a corresponding plurality of transceiver devices may be coupled to the telescoping portion of the boom to facilitate communications regardless of an orientation of the telescoping or non-telescoping portion of the boom about the axis.

In a particular embodiment, a refueling boom includes a non-telescoping portion configured to be coupled to a fuel tanker vehicle and a telescoping portion that is extendable and retractable relative to the non-telescoping portion. The telescoping portion includes a fuel nozzle. The refueling boom also includes a wireless communication system operable to enable wireless communication between a first location of the telescoping portion and a second location of the non-telescoping portion. The refueling boom also includes a control unit coupled to the telescoping portion. The control unit is operable to send first information to the fuel tanker vehicle via the wireless communication system and to receive second information from the fuel tanker vehicle via the wireless communication system.

In another particular embodiment, a method includes receiving a first signal at a first transceiver device coupled to a non-telescoping portion of a first body. The method also includes transmitting a wireless signal including information from the first signal to a second transceiver device coupled to a telescoping portion of the first body. The telescoping portion is extendable and retractable relative to the non-telescoping portion. The method also includes sending a second signal including the information from the wireless signal to a control unit coupled to the telescoping portion. The control unit is operable to perform a refueling operation responsive to the second signal.

DETAILED DESCRIPTION

Wireless communications are used to facilitate communication of control signals or other signals between a telescoping portion of a boom and a non-telescoping portion of the boom. Since no physical electrical connections may extend between the telescoping portion of the boom and the non-telescoping portion of the boom, voice communications, control signals, and other signals may be communicated wirelessly. Accordingly, translation of the telescoping portion relative to the non-telescoping portion may not result in wear and tear on wires or other sliding connections leading to possible communication failures during refueling or down time for maintenance.

Figure 1:
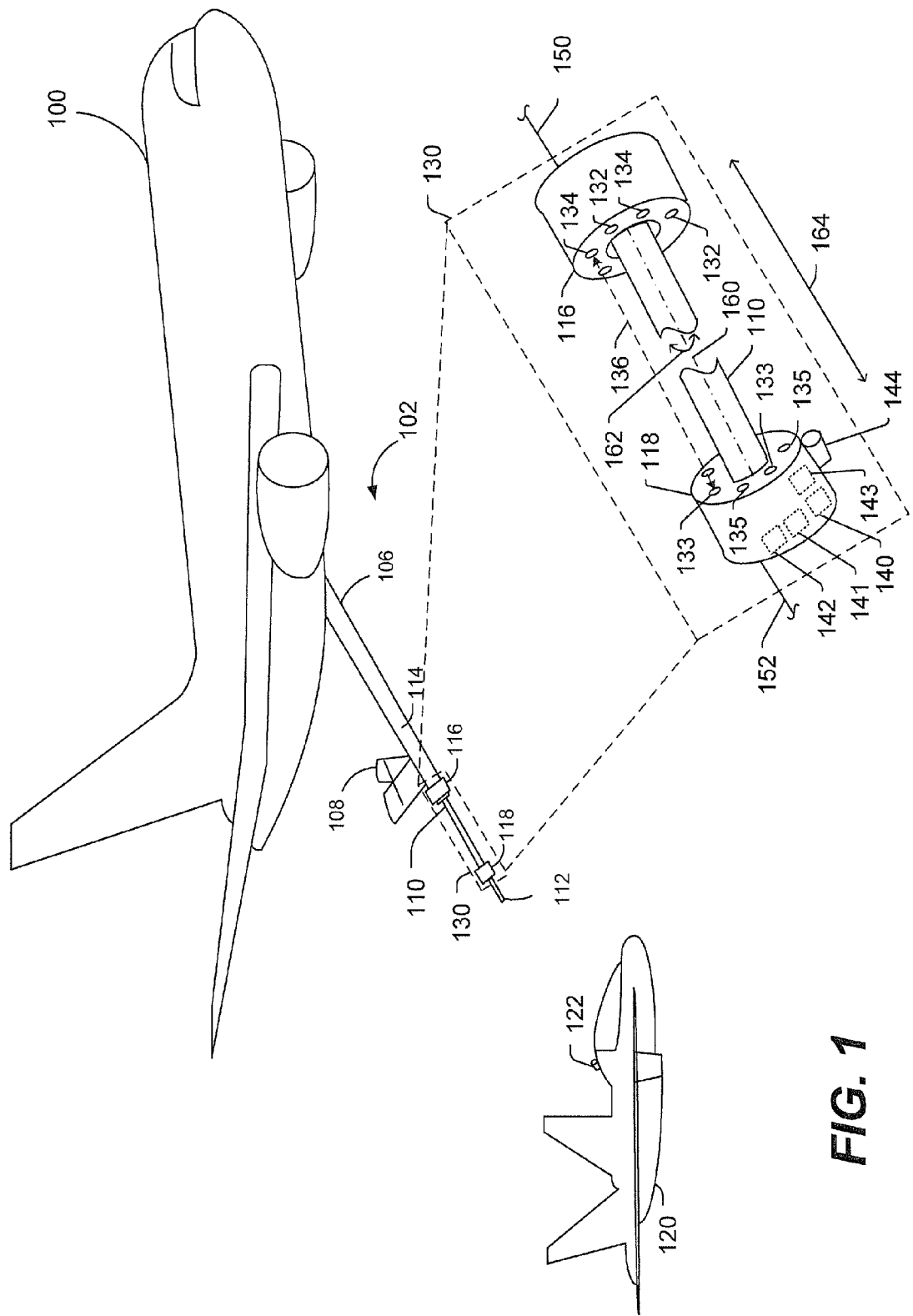
FIG. 1 is an illustration of a fuel tanker vehicle, a fuel receiving vehicle, and a particular embodiment of a wireless refueling boom.

FIG. 1 illustrates a system including a fuel tanker vehicle 100 and a fuel receiving vehicle 120. A boom system 102 coupled to the fuel tanker vehicle 100 may facilitate provision of fuel from the fuel tanker vehicle 100 to the fuel receiving vehicle 120. In the particular embodiment illustrated in FIG. 1, each of the fuel tanker vehicle 100 and the fuel receiving vehicle 120 is an aircraft; however, in other embodiments, the fuel tanker vehicle 100 and the fuel receiving vehicle 120 may be other types of vehicles, such as land craft vehicles, watercraft vehicles, or spacecraft vehicles. The boom system 102 may include a boom 106 and associated control surfaces, such as a ruddervator 108. The boom 106 may include a non-telescoping portion 114 configured to be coupled to the fuel tanker vehicle 100. The non-telescoping portion 114 for example may be hinged or otherwise adapted to move relative to the fuel tanker vehicle 100. The boom 106 may also include a telescoping portion 110. The telescoping portion 110 may be adapted to extend from and retract toward or into the non-telescoping portion 114. A fuel nozzle 112 may be coupled to the telescoping portion 110 of the boom 106. The fuel nozzle 112 may be adapted to couple to a fuel receiver 122 of the fuel receiving vehicle 120.

The boom 106 may also include a wireless communication system 130. The wireless communication system 130 may include a first transceiver system 116 coupled to the non-telescoping portion 114 of the boom 106 and a second transceiver system 118 coupled to the telescoping portion 110 of the boom 106. The wireless communication system 130 may be operable to enable wireless communications 136 between a location on the telescoping portion 110 of the boom 106 and a location on the non-telescoping portion 114 of the boom 106. For example, referring to the expanded view of the wireless communication system 130, the first transceiver system 116 may be coupled to the non-telescoping portion 114 of the boom 106 and may include a first plurality of receiver elements 132, a first plurality of transmitter elements 134, or both. The second transceiver system 118 may include a second plurality of receiver elements 133, a second plurality of transmitter elements 135, or both. The first plurality of transmitter elements 134 may be adapted to send the wireless communications 136 to the second plurality of receiver elements 133 and the second plurality of transmitter elements 135 may be adapted to send the wireless communications 136 to the first plurality of receiver elements 132. The wireless communications 136 may be transmitted via radio frequency signals, via light-based signals (such as laser or infrared communications) or via other line of sight or non-line of sight wireless communications. Accordingly, the first and second plurality of receiver elements 132, 133 and the first and second plurality of transmitter elements 134, 135 may be radio frequency sensors, optical sensors, or other line of sight or non-line of sight sensors.

The telescoping portion 110 and the non-telescoping portion 114 of the boom 106 may have a coextensive axis 160. The telescoping portion 110 of the boom 106 may rotate 162 about the axis 160 relative to the non-telescoping portion 114 and may translate along the axis 160 to extend from or retract toward the non-telescoping portion 114 of the boom 106. The first transceiver system 116 and the second transceiver system 118 may be configured to enable the wireless communications 136 to be transmitted and received regardless of an orientation of the telescoping portion 110 of the boom 106 relative to the non-telescoping portion 114 of the boom 106. For example, as the telescoping portion 110 of the boom 106 rotates 162 about the axis 160, the second transceiver system 118 may rotate relative to the first transceiver system 116. Accordingly, the second plurality of receiver elements 133 and the second plurality of transmitter elements 135 may be arranged circumferentially about the axis 160. For example, the second plurality of receiver elements 133 and the second plurality of transmitter elements 135 may be arranged such that at least one of the receiver elements 133 has a line of sight to one of the transmitter elements 134 of the first transceiver system 116 regardless of an orientation of the telescoping portion 110 relative to the non-telescoping portion 114 of the boom 106. Likewise, the transmitter elements 135 of the second transceiver system 118 may be arranged such that at least one of the transmitter elements 135 has a line of sight to one of the receiver elements 132 of the first transceiver system 116. Accordingly, regardless of the orientation of the telescoping and non-telescoping portions 110, 114 of the boom 106, the first transceiver system 116 and second transceiver system 118 can communicate via the wireless communications 136 throughout a rotation range of the telescoping portion 110 relative to the non-telescoping portion 114.

The second transceiver system 118 may include or be coupled to devices that facilitate refueling of the fuel receiving vehicle 120. For example, the second transceiver system 118 may include or be coupled to a control unit 140. The control unit 140 may perform various operations to facilitate refueling the fuel receiving vehicle 120. For example, the control unit 140 may receive information from one or more sensors 141 and may take action responsive to the sensed information. For example, the sensor 141 may include a fuel pressure sensor to sense a fuel pressure on board the fuel receiving vehicle 120 or in the boom 106. In response to a fuel pressure indication from the sensor 141, the control unit 140 may provide control information to a device on board the fuel tanker vehicle 100 or may automatically disconnect or discontinue provision of fuel to the fuel receiving vehicle 120.

In another example, the one or more sensors 141 may sense other refueling parameter information, such as an indication that the fuel nozzle 112 is coupled to the fuel receiver 122 of the fuel receiving vehicle 120. The control unit 140 may transmit data indicative of the refueling parameter information via the wireless communications 136 to a device on board the fuel tanker vehicle 100.

In another example, the control unit 140 may be coupled to one or more actuators 142. The one or more actuators 142 may be operable to couple the fuel nozzle 112 to the fuel receiver 122 of the fuel receiving vehicle 120, to disconnect the fuel nozzle 112 from the fuel receiver 122 of the fuel receiving vehicle 120, or both. The one or more actuators 142 may be operable in response to a control signal from the control unit 140. The control signal may be received at the control unit 140 via a command received wirelessly by the wireless communications 136 from the wireless transceivers 116 coupled to the boom 106 attached to the fuel tanker vehicle 100. In another example, the control unit 140 may actuate the one or more actuators 142 in response to a refueling parameter, such as a fuel pressure reading on board the fuel receiving vehicle 120 that is sensed by the one or more sensors 141. In this example, the control unit 140 may transmit information indicative of an action that is taken (e.g., to disconnect or discontinue provision of fuel to the fuel receiving vehicle 120). The control signal may be sent by the control unit 140 to the one or more actuators 142 in response to a command received from the fuel tanker vehicle 100 via the wireless communications 136.

In a particular embodiment, the second transceiver system 118 or other devices coupled to the telescoping portion 110 of the boom 106 may not receive power directly from the fuel tanker vehicle 100. Accordingly, a separate power supply 144 may be provided that is coupled to the second transceiver system 118. For example, the power supply 144 may include one or more of a ram air turbine, a battery, a solar powered device, and a fuel cell. The power supply 144 may provide power to operate the second transceiver system 118 and other devices coupled to the second transceiver system 118, such as the control unit 140, the one or more sensors 141, and the one or more actuators 142.

The second transceiver system 118 may also facilitate voice communications between the fuel tanker vehicle 100 and the fuel receiving vehicle 120. For example, the second transceiver system 118 may include or be coupled to a communications subsystem 143 that is connected via wires or other communication interfaces 152 to the fuel receiving vehicle 120 when the fuel nozzle 112 is coupled to the fuel receiver 122 of the fuel receiving vehicle 120. Additionally, the first transceiver system 116 may be coupled via wires or other communication interfaces 150 to the fuel tanker vehicle 100. Thus, voice or control signals from the fuel tanker vehicle 100 may be received via the wires or other communication interfaces 150 at the first transceiver system 116 and may be wirelessly communicated or transmitted via the plurality of transmitter elements 134 to one or more of the plurality of receiver elements 133 of the second transceiver system 118. The control unit 140 may take action responsive to the control signals received from the fuel tanker vehicle 100 or may transfer voice communications via the wires or other communication interfaces 152 to the fuel receiving vehicle 120. In addition, voice signals from the fuel receiving vehicle 120 may be received via the wires or other communication interfaces 152 at the second transceiver system 118 and may be wirelessly communicated or transmitted via the plurality of transmitter elements 135 of the second transceiver system 118 to one or more of the plurality of receiver elements 132 of the first transceiver system 116. The control unit 140 may transfer voice communications via the wires or other communication interfaces 150 to the fuel tanker vehicle 100. Accordingly, the control unit 140 is operable to send first information to the fuel tanker vehicle 100 via the wireless communications 136 and to receive second information from the fuel tanker vehicle 100 via the wireless communications 136. Accordingly, translation of the telescoping portion 110 relative to the non-telescoping portion 114 may be performed without wear and tear on wires or other sliding connections leading to possible communication failures during refueling or leading to down time for maintenance.

Figure 2:
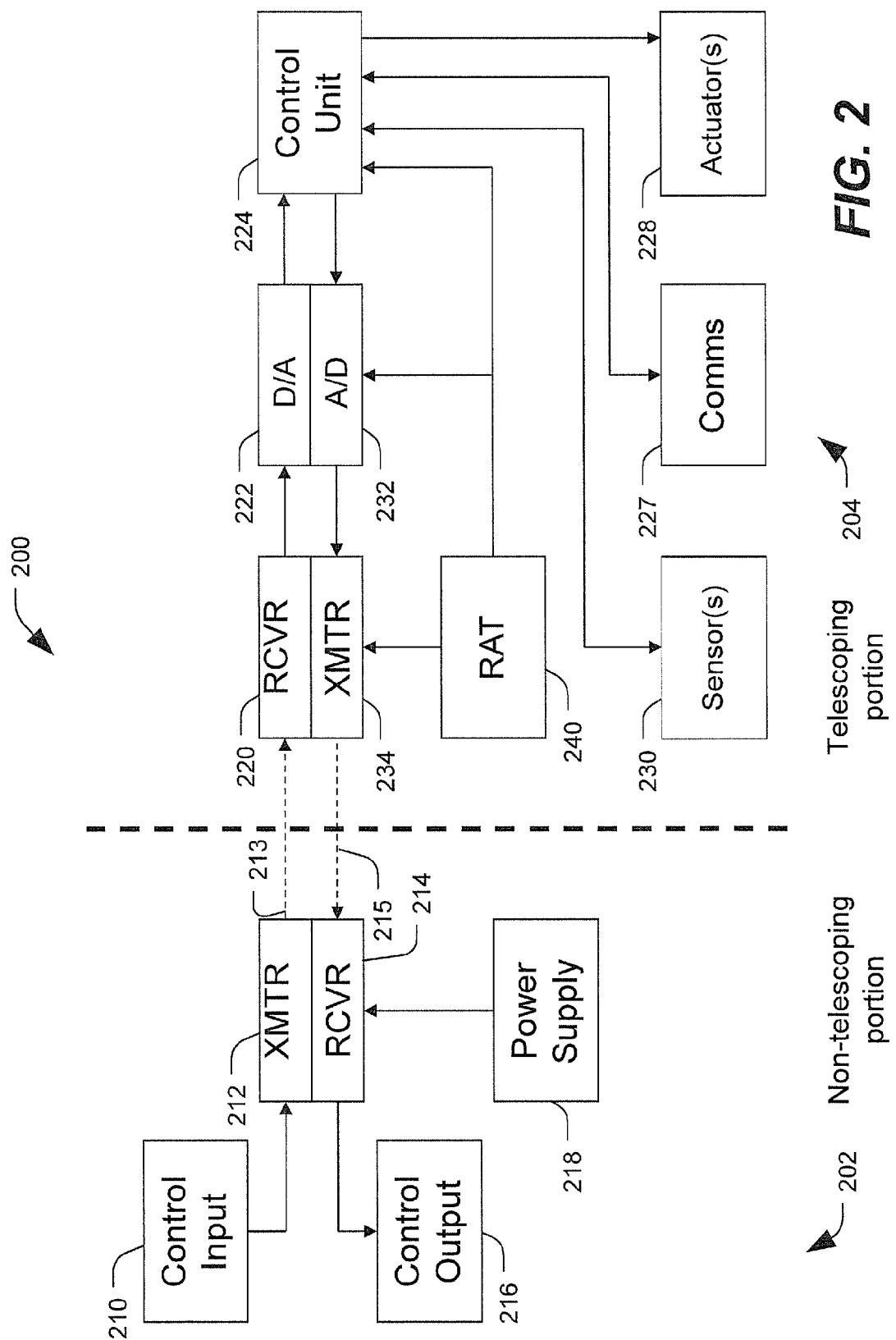
FIG. 2 is a block diagram of a particular embodiment of a wireless refueling boom system and associated systems of a fuel tanker vehicle.

FIG. 2 is a block diagram of a particular embodiment of a refueling boom system 200. The refueling boom system 200 includes a non-telescoping portion 202 and a telescoping portion 204. For example, the non-telescoping portion 202 may correspond to the non-telescoping portion 114 of the boom 106 and associated portions or systems of the fuel tanker vehicle 100 of FIG. 1. Similarly, the telescoping portion 204 may correspond to the telescoping portion 110 of the boom 106 and the second transceiver system 118 and devices coupled thereto of FIG. 1.

The non-telescoping portion 202 may include one or more devices to receive a control input 210. For example, the control input 210 may include refueling control commands, voice communications and so forth. The control input 210 may be provided to a wireless transmitter 212. The wireless transmitter 212 may transmit wireless communications 213 to one or more receivers 220 coupled to or within the telescoping portion 204. The non-telescoping portion 202 may also include one or more receivers 214. The one or more receivers 214 may receive wireless communications 215 from one or more transmitters 234 coupled to or within the telescoping portion 204. The one or more receivers 214 may provide information corresponding to data received via the wireless communications 215 to one or more devices as a control output 216. For example, the control output 216 may include data related to measurements or actions performed by a control unit 224 coupled to or within the telescoping portion 204 or may include voice communications or other communications from a fuel receiving vehicle. The non-telescoping portion 202 may also include or be coupled to a power supply 218. For example, the power supply 218 may include a generator coupled to an engine of a fuel tanker vehicle, such as the fuel tanker vehicle 100 of FIG. 1. In another example the power supply 218 may include an independent power supply of the refueling boom system 200 or another power source coupled to or provided by the fuel tanker vehicle 100.

In a particular embodiment, the non-telescoping portion 202 may receive the control input 210 and may receive power from the power supply 218 from the fuel tanker vehicle. Accordingly, the control input 210 and the power supply 218 may be associated with the fuel tanker vehicle rather than the non-telescoping portion 202 of the refueling boom system 200. Similarly, the control output 216 may be output from the refueling boom system 200 to one or more devices of the fuel tanker vehicle.

The telescoping portion 204 may include the control unit 224. The control unit 224 may be operable to perform one or more functions associated with refueling a fuel receiving vehicle. The control unit 224 may receive data wirelessly via the one or more receivers 220 of the telescoping portion 204 and may transmit data to the non-telescoping portion 202 via the one or more transmitters 234 as the wireless communications 215. In a particular embodiment, the control unit 224 may be an analog device, and the wireless communications 213, 215 may be digital signals. Accordingly, the telescoping portion 204 may include one or more digital to analog converters 222 and one or more analog to digital converters 232 to facilitate provision of the wireless communications 213 to the control unit 224 and provision of the wireless communications 215 from the control unit 224.

The telescoping portion 204 may also include one or more devices coupled to the control unit 224. For example, the control unit 224 may be coupled to one or more sensors 230. The one or more sensors 230 may be adapted to sense refueling parameters at the telescoping portion 204 or at a nozzle coupled to the telescoping portion 204. For example, the refueling parameters may include an indication that a fuel nozzle of the refueling boom system 200 is coupled to a fuel receiver of a fuel receiving vehicle. In another example, the refueling parameter may include a fuel pressure reading onboard the fuel receiving vehicle or within the refueling boom system 200.

The control unit 224 may also or in the alternative be coupled to one or more actuators 228. The one or more actuators 228 may be adapted to secure the fuel nozzle to the fuel receiving vehicle or to release the fuel nozzle from the fuel receiving vehicle. Additionally the one or more actuators 228 may include actuators to facilitate alignment of the fuel nozzle with the fuel receiving vehicle or to open or close a fuel transfer tube of the refueling boom system 200 to allow or disallow a flow of fuel from the fuel tanker vehicle through the refueling boom system 200.

The control unit 224 may also or in the alternative be coupled to a communication system 227. The communication system 227 may facilitate communication of data between the fuel tanker vehicle and the fuel receiving vehicle. The communication system 227 may also or in the alternative facilitate communication of voice communications between a party onboard the fuel tanker vehicle and a party onboard the fuel receiving vehicle.

The telescoping portion 204 may include or be coupled to a power supply that is not directly connected to the non-telescoping portion 202 or the fuel tanker vehicle, such as a ram air turbine (RAT) 240. The ram air turbine 240 may supply power to one or more devices coupled to the telescoping portion 204. For example, the ram air turbine 240 may supply power to the one or more receivers 220 and the one or more transmitters 234 of the wireless communication system. The ram air turbine 240 may also supply power to the digital to analog converters 222 and to the analog to digital converters 232. Additionally, the ram air turbine 240 may provide power to the control unit 224, the one or more actuators 228, and the one or more sensors 230.

Because the control signals are communicated wirelessly between the telescoping portion 204 of the boom 200 and the non-telescoping portion 202 of the boom 200, translation of the telescoping portion 204 of the boom 200 relative to the non-telescoping portion 202 of the boom 200 may be performed without causing wear and tear on wires or other electrical connections, such as sliding connections, that may lead to possible communication failures during refueling. In addition, the wireless communication of the control signals may accommodate rotation of the telescoping portion 204 of the boom 200 relative to the non-telescoping portion 202 of the boom 200 and may facilitate communications regardless of an orientation of the telescoping or non-telescoping portions of the boom about an axis of rotation.

Figure 3:
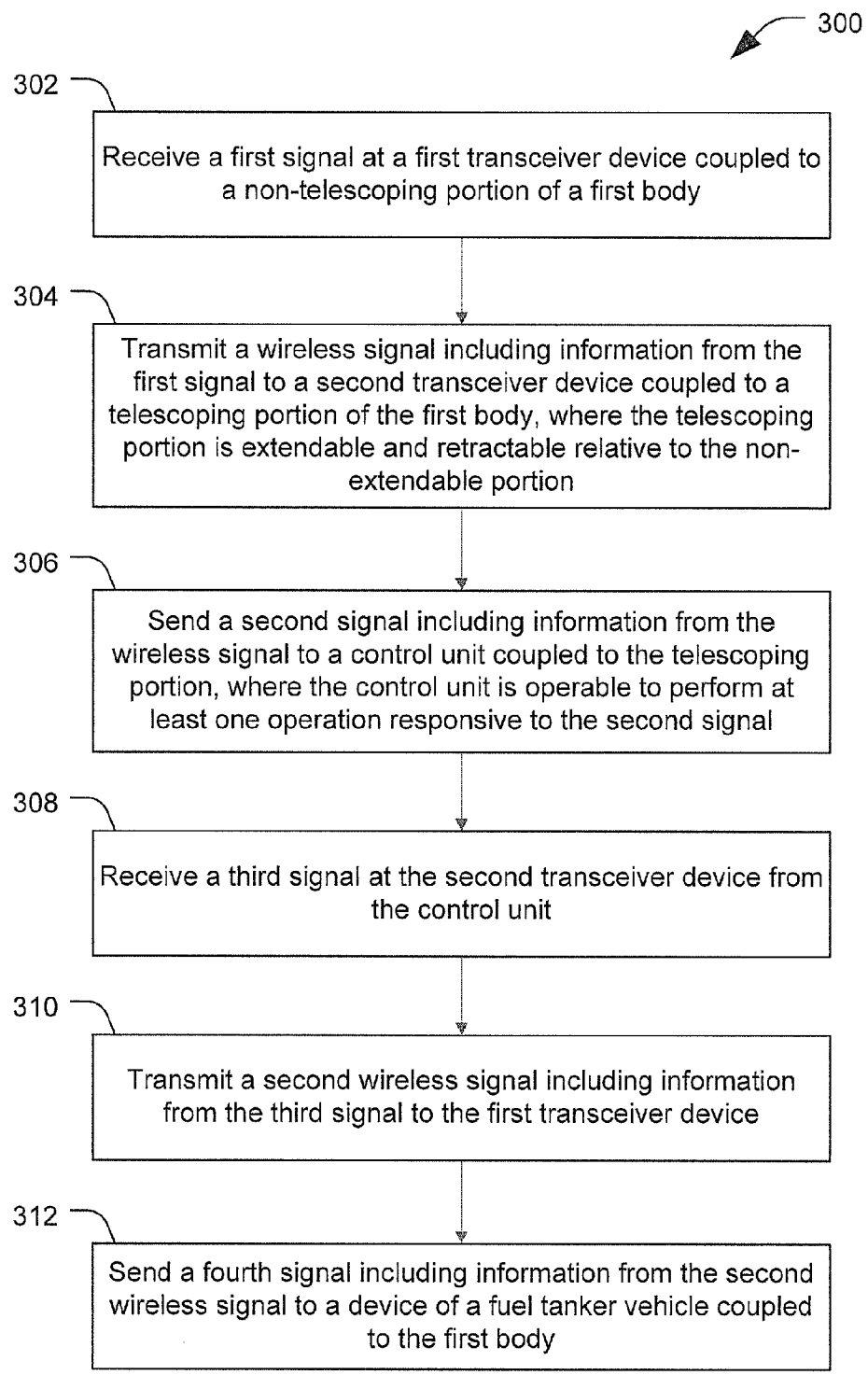
FIG. 3 is a flow diagram of a particular embodiment of a method of wirelessly controlling a refueling boom.

FIG. 3 is a flowchart of a particular embodiment of a method 300. The method 300 includes receiving a first signal at a first transceiver device coupled to a non-telescoping portion of a first body, at 302. For example, the first transceiver device may include the first transceiver system 116 of FIG. 1 (or a transmitter or receiver of the first transceiver system 116) which is coupled to the non-telescoping portion 114 of the boom 106, and the first signal may be received by the first transceiver system 116 from the fuel tanker vehicle 100 via the communication interface 150. In a particular embodiment, the first signal may include refueling control commands. The method may also include, at 304, transmitting a wireless signal including information from the first signal to a second transceiver device coupled to a telescoping portion of the first body. For example, the second transceiver device may include the second transceiver system 118 (or a transmitter or receiver of the second transceiver system 118) of FIG. 1. The wireless signal may be communicated (e.g. transmitted wirelessly) via one or more of the plurality of transmitter elements 134 of the first transceiver system 116 to one or more of the plurality of receiver elements 133 of the second transceiver system 118. The telescoping portion may be extendable and retractable relative to the non-telescoping portion. For example, the telescoping portion may include the telescoping portion 110 of the boom 106 which is extendable and retractable relative to the non-telescoping portion 114 of the boom 106. In a particular embodiment, the first signal may use or may be transmitted according to a first communications protocol and the wireless signal may be encoded to transmit information received from or derived from the first signal.

The method may also include, at 306, sending a second signal including information obtained from the wireless signal to a control unit coupled to the telescoping portion. For example, the control unit may include the control unit 140 that is coupled to the second transceiver system 118 of FIG. 1. In another example, the control unit may include the control unit 224 that is coupled to the telescoping portion 204 of the refueling boom system 200. The control unit 140 may receive the second signal (that was transmitted wirelessly) via the one or more of the plurality of receiver elements 133 of the second transceiver system 118. In a particular embodiment, the control unit 140 may be operable to perform at least one operation responsive to the second signal. For example, the control unit 140 may be operable to perform at least one of a refueling boom operation, a crane boom operation, and a truck boom operation. The refueling boom operation may include providing voice communications between the fuel tanker vehicle and the fuel receiving vehicle, sensing a fuel parameter, operating one or more actuators, and so forth. The telescoping portion may be rotatable about an axis during transmission of the wireless signal without interrupting reception of the wireless signal by the non-telescoping portion. In a particular embodiment, the wireless signal may be a digital signal and the second signal may be an analog signal. Accordingly, the method may further include converting between the digital signal and the analog signal. Alternatively, the wireless signal may be an optical signal or an infrared signal. Accordingly, a conversion between the optical signal and an electrical signal or a conversion between the infrared signal and an electrical signal may be performed. A legacy boom system that uses wires and/or contact strips and sliding brushes and the like to send electrical signals between the telescoping and non-telescoping portions of the boom may be retrofitted with or replaced by a wireless communication system that transmits control signals wirelessly between the telescoping and non-telescoping portions of the boom. The control signals may be converted into electrical signals that perform the communication, activation, and monitoring functions described above.

The method may also include, at 308, receiving a third signal at the second transceiver device from the control unit. For example, the third signal may include sensed data or information related to the refueling operation performed in response to the second signal. For example, the control unit 140 may receive information from the one or more sensors 141 and may provide information to the second transceiver system 118 via the one or more of the plurality of receiver elements 133 of the second transceiver system 118.

The method may also include, at 310, transmitting a second wireless signal including information from the third signal to the first transceiver device. For example, the information provided to the second transceiver system 118 may be transmitted or communicated wirelessly via one or more of the plurality of transmitter elements 135 of the second transceiver system 118 to one or more of the plurality of receiver elements 132 of the first transceiver system 116.

The method may also include, at 312, sending a fourth signal including information from the second wireless signal from the second transceiver device to a device of the fuel tanker vehicle that is coupled to the refueling boom. For example, the fourth signal may include voice communications from a fuel receiving vehicle or information related to the refueling operation from the control unit. For example, the control unit 140 may transmit data indicative of the refueling operation including the fourth signal via the wireless communications 136 to a device on board the fuel tanker vehicle 100. As another example, the fourth signal may be transmitted or communicated by the second transceiver system 118 via the communications subsystem 143 to the fuel tanker vehicle 100.

By using a wireless system that transmits control signals between a telescoping portion of a boom and a non-telescoping portion of the boom, translation or rotation of the telescoping portion relative to the non-telescoping portion may be performed without causing wear and tear on wires or other sliding connections that could lead to possible communication failures during refueling.

Figure 4:
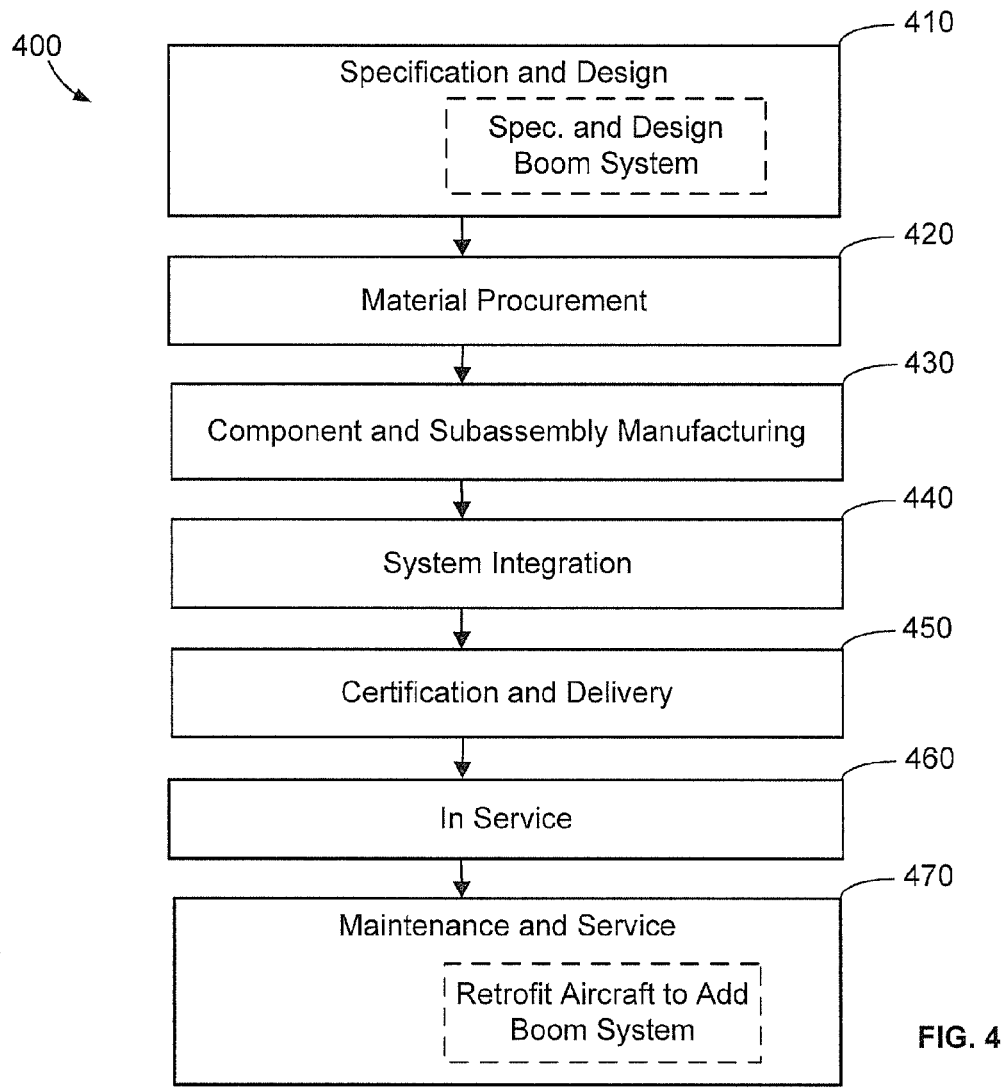
FIG. 4 is a flow diagram of an aircraft production and service methodology.
Figure 5:
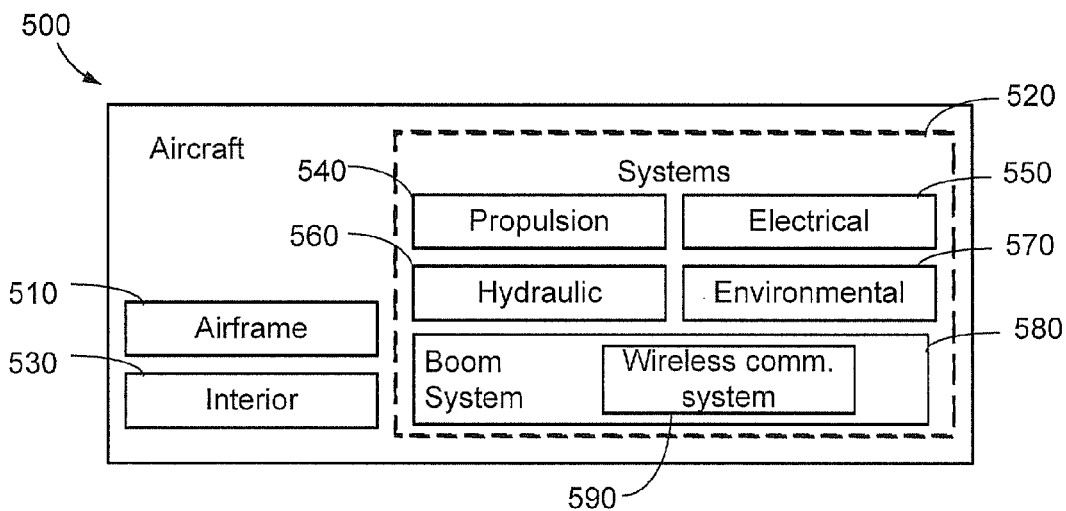
FIG. 5 is a block diagram of functional groups of an aircraft including a wireless refueling boom.

Embodiments of the disclosure may be described in the context of an aircraft manufacturing and service method 400 as shown in FIG. 4 and an aircraft 500 as shown in FIG. 5. During pre-production, the method 400 may include specification and design 410 of the aircraft 500 and material procurement 420. During production, component and subassembly manufacturing 430 and system integration 440 of the aircraft 500 takes place. Thereafter, the aircraft 500 may go through certification and delivery 450 in order to be placed in service 460. While in service by a customer, the aircraft 500 is scheduled for routine maintenance and service 470 (which may also include modification, reconfiguration, refurbishment, and so on).

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, a leasing company, a military entity, a service organization, and so on.

As shown in FIG. 5, the aircraft 500 produced by the exemplary method 400 may include an airframe 510 with a plurality of systems 520 and an interior 530. Examples of high-level systems 520 include one or more of a propulsion system 540, an electrical system 550, a hydraulic system 560, an environmental system 570, a boom system 580, and a wireless communication system 590. Any number of other systems may be included. Although an aerospace example is shown, the principles of the various embodiments may be applied to other industries, such as the automotive or shipping industry.

Apparatus and methods embodied herein may be employed during any one or more of the stages of the production and service method 400. For example, components or subassemblies corresponding to the component and subassembly manufacturing 430 may be fabricated or manufactured in a manner similar to components or subassemblies produced while the aircraft 500 is in service. Also, one or more apparatus embodiments, method embodiments, or a combination thereof may be utilized during the production stages, such as the system integration 440 and the certification and delivery 450, for example, by substantially expediting assembly of or reducing the cost of an aircraft 500. Similarly, one or more of apparatus embodiments, method embodiments, or a combination thereof may be utilized while the aircraft 500 is in service, for example and without limitation, during maintenance and service 470. For example, the boom may be fitted during the specification and design 410, the material procurement 420, the component and subassembly manufacturing 430, and the system integration 440, or may be retrofit during the maintenance and service 470 to provide the aircraft 500 with a boom with a wireless communication system.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, claimed subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A refueling boom comprising:
a non-telescoping portion configured to be coupled to a fuel tanker vehicle;
a telescoping portion that is extendable and retractable relative to the non-telescoping portion, the telescoping portion including a fuel nozzle;
a wireless communication system operable to enable wireless communication between a first location of the telescoping portion to a second location of the non-telescoping portion, wherein the wireless communication system includes:
a first transceiver system positioned circumferentially around a first axis of the non-telescoping portion;
a second transceiver system positioned circumferentially around a second axis of the telescoping portion, wherein the telescoping portion is rotatable about the first axis of the non-telescoping portion, and wherein the first transceiver system and the second transceiver system are arranged to enable wireless communication through a rotation range of the telescoping portion relative to the non-telescoping portion; and
a control unit coupled to the telescoping portion, wherein the control unit is operable to send first information to the fuel tanker vehicle via the wireless communication system and to receive second information from the fuel tanker vehicle via the wireless communication system.

2. The refueling boom of claim 1, further comprising at least one actuator coupled to the fuel nozzle, the at least one actuator operable to engage a first receiver of a fuel receiving vehicle and to disengage from the first receiver of the fuel receiving vehicle in response to a control signal from the control unit.

3. The refueling boom of claim 2, wherein the control unit sends the control signal to the at least one actuator in response to a command received wirelessly from the fuel tanker vehicle via the wireless communication system.

4. The refueling boom of claim 1, further comprising a power supply coupled to the telescoping portion, wherein the power supply provides power to one or more components of the telescoping portion.

5. The refueling boom of claim 4, wherein the power supply comprises a ram air turbine.

6. The refueling boom of claim 1, wherein the wireless communication enabled by the wireless communication system includes voice communication between the fuel tanker vehicle and a fuel receiving vehicle.

7. The refueling boom of claim 1, further comprising at least one sensor coupled to the control unit, wherein the at least one sensor is operable to detect a refueling parameter, and wherein the control unit transmits data indicative of the refueling parameter via the wireless communication system.

8. The refueling boom of claim 7, wherein the refueling parameter includes a fuel pressure reading onboard a fuel receiving vehicle.

9. The refueling boom of claim 1, wherein the wireless communication is transmitted via radio frequency signals.

10. The refueling boom of claim 1, wherein the wireless communication is transmitted via light-based signals.

11. A method comprising:
receiving a first signal at a first transceiver system of a wireless communication system, wherein the first transceiver system is coupled to a non-telescoping portion of a refueling boom coupled to a fuel tanker vehicle, and wherein the first transceiver system is positioned circumferentially around a first axis of the non-telescoping portion;
transmitting a wireless signal including first information from the first signal to a second transceiver system of the wireless communication system, wherein the second transceiver system is coupled to a telescoping portion of the refueling boom, the telescoping portion including a fuel nozzle, wherein the wireless communication system is operable to enable wireless communication between a first location of the telescoping portion to a second location of the non-telescoping portion, wherein the telescoping portion is extendable and retractable relative to the non-telescoping portion, wherein the second transceiver system is positioned circumferentially around a second axis of the telescoping portion, and wherein the first transceiver system and the second transceiver system are arranged to enable wireless communication through a rotation range of the telescoping portion relative to the non-telescoping portion; and
sending a second signal including the first information to a control unit coupled to the telescoping portion, wherein the control unit is operable to perform at least one operation responsive to the second signal, and wherein the control unit is operable to send second information to the fuel tanker vehicle via the wireless communication system.

12. The method of claim 11, wherein the at least one operation comprises engaging the fuel nozzle to a fuel receiver of a fuel receiving vehicle.

13. The method of claim 11, wherein the wireless signal is a digital signal and the second signal is an analog signal, and wherein the method further comprises converting between the digital signal and the analog signal.

14. The method of claim 11, further comprising:
receiving a third signal at the second transceiver system from the control unit;
transmitting a second wireless signal including information from the third signal to the first transceiver system; and
sending a fourth signal including information from the second wireless signal to the fuel tanker vehicle.

* * * * *